C. E. ROGERS.
TEETHING NIPPLES.
No. 190,908.                            Patented May 15, 1877.
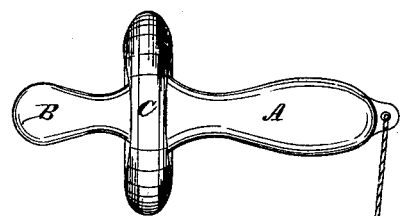
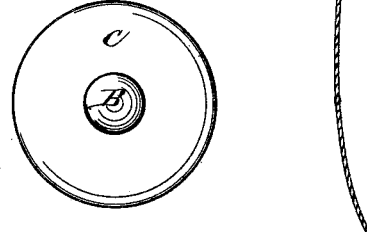

UNITED STATES PATENT OFFICE.

CHARLES E. ROGERS, OF LA CROSSE, WISCONSIN.

IMPROVEMENT IN TEETHING-NIPPLES.

Specification forming part of Letters Patent No. 190,908, dated May 15, 1877; application filed November 27, 1876.

*To all whom it may concern:*

Be it known that I, CHAS. E. ROGERS, of the city and county of La Crosse, and State of Wisconsin, have invented a new and Improved Teething-Nipple; and I do hereby declare that the following is a full, clear, and exact description of the same, reference being had to the accompanying drawing, forming part of this specification, in which—

Figure 1 is a side elevation; Fig. 2, an end view.

The invention relates to the teething of children, and means by which this tedious and critical operation of nature may be facilitated. It consists in an instrumentality of peculiar form and construction, the same being provided with a handle to adapt it to be manipulated by the child, and a nipple of such shape and length that the gums in front and on each side may be brought to bear upon it, while it cannot be forced so far into the mouth or throat as to do harm.

A represents the handle, which is sufficiently long and large to be easily grasped by the child's hand, bulging at the outer end and inclining toward the middle, so that the hand may not readily lose its hold. B is the nipple itself, made just long enough to enable the end to reach the gums or sides of the mouth, while it is inclined to the middle, so as to have a tendency to be drawn into the mouth.

Between the handle A and nipple B is placed a guard, C, that prevents the device from being taken into the cavity of the mouth, or to reach with its extremity into the throat. This guard may be made of any form, but is preferably made circular or in disk shape, the whole article being provided with a rounded smooth surface, so as to create no unpleasant pressure or friction at any point. It may be made of hard rubber or any other suitable material.

The handle is one to which the baby will cling with great tenacity, being adapted in shape to its hand. The nipple will then be intuitively carried to the mouth, and the aching gum quickly pressed upon it. It may be conveniently attached to the neck by a string passed through an eye on the end of the handle, so that, if dropped, it cannot pass beyond the reach of the child.

I am aware that a flat piece of soft rubber or other elastic material has been used with an intermediate guard; but

What I claim is—

An article of manufacture formed of hard material, having the handle A and nipple B, smooth, round, and tapered toward the intermediate guard C, as and for the purpose specified.

CHARLES E. ROGERS.

Witnesses:
T. H. SPENCE,
D. DRUMMOND, Jr.